Figure 1:
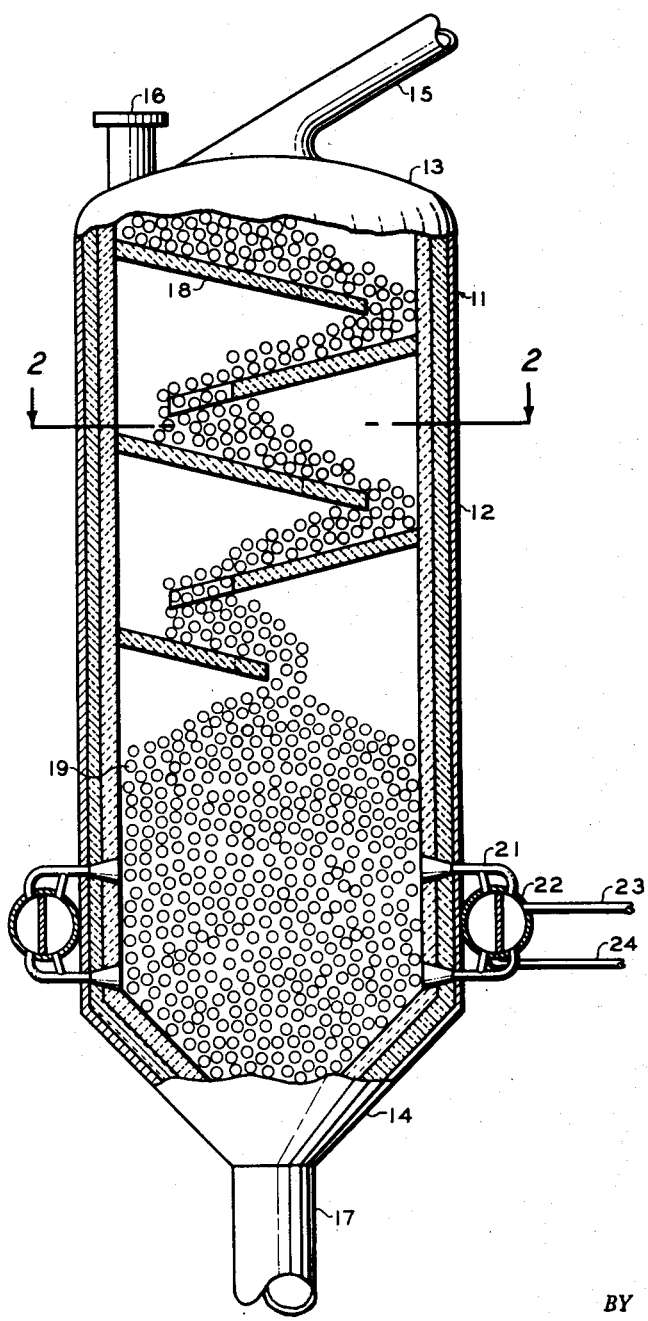

Oct. 28, 1952     L. J. WEBER     2,615,703
PEBBLE HEATING CHAMBER

Filed Oct. 11, 1948     2 SHEETS—SHEET 1

INVENTOR.
L. J. WEBER
BY Hudson and Young
ATTORNEYS

Oct. 28, 1952          L. J. WEBER          2,615,703

PEBBLE HEATING CHAMBER

Filed Oct. 11, 1948          2 SHEETS—SHEET 2

INVENTOR.
L. J. WEBER

BY *Hudson and Young*

ATTORNEYS

Patented Oct. 28, 1952

2,615,703

UNITED STATES PATENT OFFICE 2,615,703

PEBBLE HEATING CHAMBER

Louis J. Weber, Bartlesville, Okla., assignor to Phillips Petroleum Company, a corporation of Delaware Application October 11, 1948, Serial No. 53,877

3 Claims. (Cl. 263—19)

This invention relates to pebble heater apparatus. In one of its more specific aspects, it relates to improved pebble heater chambers of pebble heater apparatus. In another of its more specific aspects, it relates to an improved method of operating a pebble heater chamber.

Heat exchange units which are commonly called pebble heater apparatus are conventionally used for many types of gas heating, treating, and converting processes. Conventional pebble heater apparatus utilize a flowing mass of solid heat exchange material which flows downwardly as a contiguous mass, ordinarily through two chambers, which chambers are disposed in vertical alignment and connected by a constricted throat extending therebetween. Gaseous heating material is injected into the lower portion of the upper of the two chambers and is passed as a hot gaseous heat exchange medium upwardly and in countercurrent flow to the downwardly flowing solid heat exchange material within that chamber. The gaseous heat exchange material ordinarily is in the form of hot combustion gases. Conventional upper chambers of such apparatus, which are commonly termed "pebble heater chambers," are commonly provided with separate combustion chambers which are disposed adjacent the lower portion of the pebble heater chamber. Fuel and air are injected into the separate combustion chambers where the fuel is burned so as to form hot combustion gases which are then passed into direct heat exchange with the downwardly flowing solid heat exchange material within the pebble heater chamber. The use of such separate combustion chambers presents several problems, among which are, first, the difficulties of uniform dispersion of the hot gaseous heat exchange material through the moving portion of the flowing solid heat exchange material bed and, secondly, requires additional parts which are subjected to the high temperatures utilized within the pebble heater chamber and which parts are subject to considerable deterioration and errosion due to the high temperatures used.

In most conventional pebble heater apparatus, large volumes of pebbles have been utilized as the solid heat exchange material. The term "pebbles" as used herein denotes any solid refractory material of flowable size and form having sufficient strength to withstand mechanical pressures encountered within the pebble heater apparatus and which is suitable to carry large amounts of heat from the pebble heater chamber to the lower or gas heater chamber without rapid deterioration or substantial breakage. Pebbles conventionally used in pebble heater apparatus are ordinarily substantially spherical in shape and range from about one-eighth inch to about one inch in diameter. In high temperature processes, pebbles having a diameter of between about one-fourth inch and three-eighths inch are preferred. The pebbles must be formed of a refractory material which will withstand temperatures at least as high as the highest temperature attained in the pebble heater chamber. The pebbles must also be capable of withstanding temperature changes encountered within the apparatus. Refractory materials such as metal alloys, ceramics, or other satisfactory material may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500°. Pebbles which are used may be either inert or catalytic, depending upon the process carried on within the apparatus.

When the pebbles are withdrawn from a substantially center point in the bottom of the pebble heater chamber and are passed downwardly into a gas heater chamber to form a second moving bed of pebbles therein, relatively stagnant zones of pebbles have been found to be formed within the pebble heater chamber. Such stagnant zones have been found to exist below an imaginary cone having its vertex angle at the pebble outlet in the bottom of the pebble chamber. The vertex angle of that imaginary cone generally varies between about 40° and 120°. That cone is determined by the angle of slip of the pebbles within the pebble chamber, which angle of slip varies between about 30° and 70° and may be defined generally as the angle between a horizontal plane and the line of cleavage between stagnant and moving zones of pebbles as the pebbles are withdrawn through a constricted pebble outlet in the bottom of the pebble chamber. It will thus be seen that in chambers having large diameters, a large proportion of the pebble beds therein are contained within the stagnant pebble zones defined above.

Some conventional pebble heater apparatus have been designed so as to utilize pebble chambers of relatively small diameter in which pebble beds of considerably greater depth are maintained. In that modification, the problem of excessive pressure drop through the pebble bed has been encountered. When the depth of the pebble bed has been decreased so as to cut down on the pressure drop the volume of pebbles handled in the pebble heater chamber has, in most cases, proved to be insufficient.

An object of this invention is to provide an improved pebble heater chamber. Another object of the invention is to provide a pebble heater chamber for heating relatively shallow beds of pebbles. Another object of the invention is to provide a pebble heater chamber for heating large volumes of pebbles with a heating gas maintained under a relatively slight pressure. Another object of the invention is to provide an improved method for heating large volumes of pebbles. Other and further objects and advantages will be apparent upon study of the accompanying discussion and the drawings.

Figure 5:
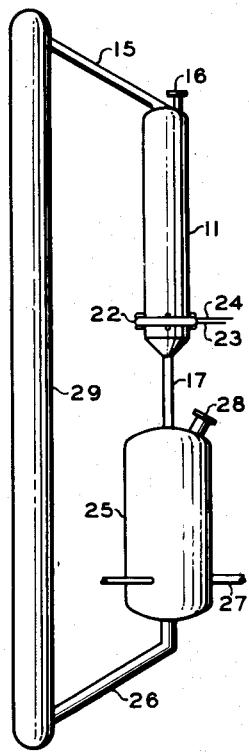
Figure 2:
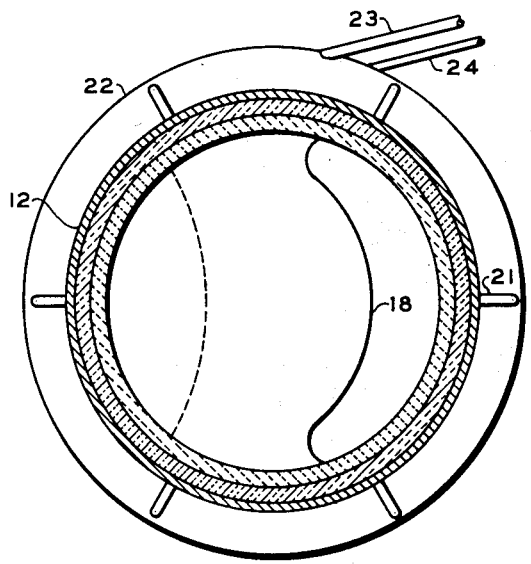
Figure 4:
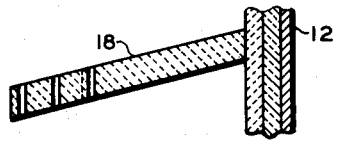
Figure 3:
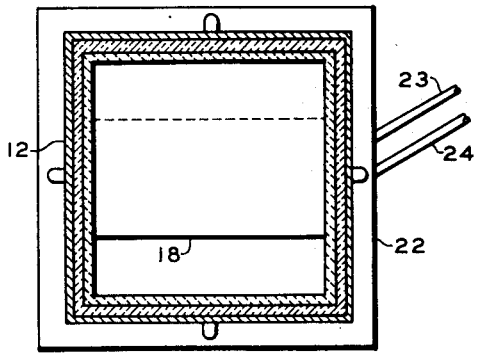

Understanding of the invention will be facilitated upon reference to the diagrammatic drawings in which Figure 1 is an elevation, partially in section, of a pebble heater chamber embodying the invention. Figure 2 is a horizontal section taken along line 2—2 of Figure 1. Figure 3 is another horizontal section of a pebble heater chamber embodying a modification of the invention which pebble heater chamber has walls which are joined at right angles. Figure 4 is a broken section of a pebble heater chamber showing a baffle embodying a modification of the invention. Figure 5 is a schematic view of a pebble heater apparatus.

In Figure 1 of the drawing, pebble heater chamber 11 comprises a substantially vertically disposed closed outer shell 12 which is closed at its upper and lower ends by closure members 13 and 14, respectively. Shell 12 may be either in the form of an elongated cylinder or may be an elongated chamber, the walls of which are joined at right angles, preferably as a square. Closure member 14 may be either flat or conical as shown in Figure 1. The conical form is preferable because in that manner a large portion of the stagnant pebble area is eliminated from the pebble bed, the slope of the bottom approaching the deviation from the horizontal of the angle of slip. Pebble inlet conduit 15 and effluent outlet conduit 16 are provided in closure member 13. Pebble outlet conduit 17 is preferably centrally located in closure member 14. Shell 12, which is normally a metal vessel, may be internally insulated by layers of insulation material such as refractory and super-refractory materials. Baffle members 18 are provided within the chamber formed by shell 12 and are alternately disposed so as to extend laterally and downwardly from opposite sides of shell 12. In that manner, a series of intermeshed or overlapping baffles is provided within the chamber formed by shell 12 and that series extends from the pebble inlet end of chamber 11 at least through the upper portion of the chamber, and preferably, extends downwardly at least a portion of the distance into the lower portion of the chamber. Baffle members 18 may be provided in a variety of forms. When a cylindrical chamber is utilized as the pebble heater chamber, the lower end or lip of baffle members 18 will preferably be in the form of an arc. When that type of baffle is used, however, the arcs of the lower ends of the baffles should be in the same direction across the pebble heater chamber. In other words, when the lip of the upper baffle is in the shape of a convex arc with relation to the baffle as is shown by a solid line in Figure 2 of the drawing, the lip of the next baffle is in the shape of a concave arc with relation to the baffle as shown by the dotted line in Figure 2 of the drawing. The arcs of the lips of the baffles thus extend in the same lateral direction. The lowest baffle in the chamber is preferably of such length that its lower lip terminates in approximately the center of the chamber. In the modification of baffles shown in Figure 3 of the drawing, in which the cross section of the pebble heater chamber may be in the form of a square or a rectangle, the lower ends of baffle members 18 preferably extend across the chamber parallel to the opposite chamber wall. It will be noted that in chambers utilizing the type of baffle disclosed in Figures 2 and 3 of the drawing, a substantially uniform overlap distance is maintained between baffles. In other words, the pebbles falling from one point on the lip of an upper baffle onto the surface of the next adjoining or subjacent baffle will have substantially the same distance to travel before falling from the lip of the second baffle as a pebble falling from another point on the upper baffle would be required to travel before falling from the lip of the second baffle. This may be modified for the lowest baffle when it is desired for the pebbles to be discharged onto the central portion of the pebble bed. Baffles 18, shown in Figures 1, 2 and 3, may be perforate in their overlapping portions as shown in Figure 4 so as to reduce the pressure drop through the pebble heater chamber even more than it would be reduced with the imperforate baffles.

Baffle members 18 are spaced at their lower ends from the opposite chamber wall and from adjoining baffles by at least 8 diameters of pebbles utilized within the pebble heater chamber. The baffles preferably close between 5/8 and 3/4 of the cross-sectional area of the chamber. The slope of the baffles 18 within the chamber is at least 15° from the horizontal and is preferably established between about 35° and 70° from the horizontal so as to insure uniform pebble flow downwardly over the pebble surface. A fluid mass of pebbles 19 is provided in the lower portion of chamber 11 so as to extend from the lowest baffle 18 through pebble outlet 17 in closure member 14. The stream of ever changing pebbles is also provided so as to cover at least a portion of the upper surface of each of baffles 18. Fuel-air injectors 21 are provided in the lower portion of shell 12 so as to be adjacent the lower portion of the fluid pebble mass in the lower portion of chamber 11. Injectors 21 may be provided as shown in Figure 1 of the drawing or they may be moved lower so as to be adjacent the conical closure of chamber 11 and may be disposed at any angle which will direct the fuel into the chamber. Injectors 21 communicate with fuel-air header 22 which in turn communicates with air and fuel supplies through air inlet conduit 23 and fuel inlet conduit 24. A plurality of injectors 21 may be disposed adjacent the pebble mass in the lower portion of chamber 11. These injectors may be so positioned as to inject fuel into any horizontal cross-section of the pebble mass. Valves may also be provided in injectors 21 so as to stop or vary the flow of fuel through any given injector.

Shell 12 is preferably of small diameter or cross-section so as to substantially reduce the volume of stagnant pebbles resulting from pebble withdrawal from central disposed pebble outlet 17. With such a reduction in horizontal cross-section of the pebble heater chamber, the fluid pebble mass in the lower portion of chamber 11 is preferably maintained in a height to width ratio of at least 1.5:1 so as to gain relatively uniform pebble flow. This invention, however, provides a means of recovering heat from flue gases while at the same time maintaining a pebble bed which is relatively shallow in comparison to deep, small diameter beds through which the pressure drop is unduly great.

In the operation of the device shown in Figures 1 and 5 of the drawing, pebbles are admitted to pebble heater chamber 11 through pebble inlet conduit 15 and form a contiguous pebble stream which flows downwardly over the surface of pebble baffles 18. When the rate of pebble supply is sufficiently great, the pebble stream flowing in a tortuous or vertically disposed zigzag path downwardly over the pebble baffles is substantially contiguous from the pebble inlet conduit 15 downwardly to the top of the fluid pebble mass in the lower portion of chamber 11. A fuel-air mixture is supplied through fuel-air injectors 21 into direct contact with the flowing mass of pebbles in the lower portion of chamber 11 and is ignited so as to burn on the surface of pebbles 19 within the bed. The fuel utilized for such a feed is preferably in a gaseous or vaporous form and the amount of air injected with the fuel should be sufficient to provide an amount of oxygen in excess of that required to support complete combustion of the fuel. This disclosure of the introduction of a fuel-air mixture is contemplated to be broad enough to also include the injection of a fuel-oxygen mixture into chamber 11.

The volume of fuel-air mixture injected into chamber 11 is controlled so as to provide the desired amount of B. t. u.'s to heat the downwardly flowing pebbles to the desired temperature. Once ignited, the fuel heats the pebbles to such a temperature that substantially complete combustion is accomplished on the surface of the pebbles in the lower portion of the pebble chamber. Combustion gases formed by the combustion of the fuel on the surface of the pebbles, flow upwardly through the fluid pebble mass and countercurrently take the tortuous or zigzag path taken by the stream of pebbles flowing downwardly over the series of pebble baffles 18. When the pebble baffles are imperforate, the total flow of combustion gases is along the surface of the baffle members and the pebble stream supported by the baffles. When the pebble flow rate is sufficiently great to provide a contiguous stream of pebbles from pebble inlet 15 to the top of the fluid pebble mass in the lower portion of chamber 11, the upwardly flowing combustion gases will flow over the pebbles on the surface of baffles 18 and upwardly through the column of pebbles extending between the lip of one baffle and the surface of the next succeeding baffle.

Gaseous effluent material is removed from chamber 11 through effluent outlet conduit 16. In those cases in which baffle member 18 are perforate in their overlapping sections, the cross-sectional area of the perforations in the baffles should be such as to allow only a portion of the upwardly flowing gas to pass therethrough, thus causing the balance of the combustion gases to follow a course totally countercurrent to the flow of the pebble stream over the surface of the baffles.

The heated pebbles are passed downwardly into gas heating chamber 25 and are removed from the bottom of chamber 25 through pebble outlet conduit 26. The pebble flow established in the pebble heater will thus be noted to be contiguous at least from the lowest baffle in chamber 11 through pebble outlet conduit 17 of chamber 11, through chamber 25 and pebble outlet conduit 26. The extent of contiguous pebble flow may be increased to include that portion of pebble flow over baffles 18. Gaseous materials to be heated, treated, or converted in chamber 25 are injected into that chamber through gaseous material inlet conduit 27 and the heated, treated, or converted gaseous materials are removed from the upper portion of chamber 25 through effluent outlet conduit 28. Cooled pebbles which are removed from chamber 25 through pebble outlet conduit 26 are elevated by elevator means 29 to pebble inlet conduit 15 through which they are once again admitted into the upper portion of pebble heater chamber 11.

Pebble inlets and outlets of the pebble heater apparatus shown in Figures 1 and 5 of the drawings should be of such diameter as to be at least as great as 7 or 8 diameters of the pebbles utilized within pebble heater apparatus. By such sizing of the pebble conduits, bridging of the pebbles within those conduits will be substantially obviated.

Various modifications in baffle structure, baffle positions, and method of operating the device shown in Figures 1 and 5 of the drawing may be made by those skilled in the art without departing from the spirit or the scope of the disclosure.

I claim:

1. An improved pebble heater chamber of pebble heater apparatus which comprises in combination an upright outer shell, closed at its ends; a pebble inlet in the upper end of said shell; an effluent outlet in the upper end of said shell; a pebble outlet in the lower end of said shell; a series of intermeshed baffle members supported by said shell and disposed through at least the upper portion of the chamber within said shell, said baffles being alternately disposed so as to slope laterally and downwardly from opposite sides of said shell and seal opposite sides of said chamber against pebble and gas flow, the lower end of each said baffle being spaced from the opposite side of said shell and from the top surface of subjacent baffles by at least 8 diameters of pebbles utilized within said chamber and the lowest said baffle being spaced from the bottom of said shell by at least 1.5 chamber widths; and at least one fuel-air injector in the lower portion of said shell below said baffles.

2. The pebble heater chamber of claim 1 wherein said shell is cylindrical and the lower ends of said baffles are formed as arcs, which arcs extend in the same lateral direction.

3. The pebble heater chamber of claim 1 wherein the side walls of said shell are adjoined at right angles, and said baffles have a uniform overlap across the entire width of said chamber.

LOUIS J. WEBER.

REFERENCES CITED

The following references are of record in the file of this patent:

UNITED STATES PATENTS

| Number | Name | Date |
|---|---|---|
| 318,704 | Diehl | May 26, 1885 |
| 884,696 | Wilson | Apr. 14, 1908 |
| 1,102,714 | Bornmann | July 7, 1914 |
| 2,068,574 | Smith | Jan. 19, 1937 |
| 2,227,416 | Payne | Dec. 31, 1940 |
| 2,386,670 | Evans | Oct. 9, 1945 |
| 2,399,450 | Ramseyer | Apr. 30, 1946 |
| 2,420,376 | Johansson | May 13, 1947 |
| 2,437,383 | Dalton | Mar. 9, 1948 |
| 2,439,372 | Simpson | Apr. 6, 1948 |

FOREIGN PATENTS

| Number | Country | Date |
|---|---|---|
| 12,664 | Great Britain | 1899 |
| 613,777 | Germany | May 27, 1935 |